(12) United States Patent
Kim et al.

(10) Patent No.: US 11,276,239 B2
(45) Date of Patent: Mar. 15, 2022

(54) METHOD AND APPARATUS FOR PROVIDING VIDEO INFORMATION

(71) Applicant: SAMSUNG SDS CO., LTD., Seoul (KR)

(72) Inventors: Seung Jin Kim, Seoul (KR); Hee Tae Yoon, Seoul (KR); Jun Ho Kang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/117,557

(22) Filed: Dec. 10, 2020

(65) Prior Publication Data

US 2021/0183151 A1 Jun. 17, 2021

(30) Foreign Application Priority Data

Dec. 16, 2019 (KR) .................. 10-2019-0167998

(51) Int. Cl.
*G06T 19/00* (2011.01)
*G06T 7/70* (2017.01)
*G06T 19/20* (2011.01)
*G06F 3/14* (2006.01)

(52) U.S. Cl.
CPC .......... *G06T 19/006* (2013.01); *G06F 3/1454* (2013.01); *G06T 7/70* (2017.01); *G06T 19/20* (2013.01); *G06T 2200/24* (2013.01); *G06T 2207/10016* (2013.01); *G06T 2219/024* (2013.01); *G06T 2219/2004* (2013.01); *G06T 2219/2016* (2013.01)

(58) Field of Classification Search
CPC ......... G06T 19/006; G06T 7/70; G06T 19/20; G06T 2200/24; G06T 2207/10016; G06T 2219/024; G06T 2219/2004; G06T 2219/2016; G06T 2207/10028; G06T 7/20; G06T 7/74; G06T 7/80; G06T 7/246; G06T 11/60; G06F 3/1454; G06F 3/017; G06F 3/011; G06F 3/013; H04N 19/137; H04N 19/167; G06K 9/00744; G06K 9/00671
See application file for complete search history.

(56) References Cited

U.S. PATENT DOCUMENTS

| 10,839,557 B1* | 11/2020 | Arora .................... H04N 13/246 |
| 2014/0267723 A1* | 9/2014 | Davidson, Jr ........ G06T 19/006 348/147 |
| 2018/0082430 A1* | 3/2018 | Sharma .............. G06K 9/00671 |

FOREIGN PATENT DOCUMENTS

KR  10-2019-0016828 A  2/2019

* cited by examiner

*Primary Examiner* — Xilin Guo
(74) *Attorney, Agent, or Firm* — The PL Law Group, PLLC

(57) ABSTRACT

A method according to an aspect of the disclosure is performed by a computing device and includes rendering a video frame, displaying an object generated by user manipulation on the rendered video frame, calculating a relative position of the object with respect to a reference point of the video frame, and transmitting object information generated based on the relative position of the object. According to the method, even if the streaming screen continuously changes when streaming video between remote terminals, the shared 3D object can be placed at an accurate position, and objective position information of the shared 3D object can be provided regardless of the surrounding environment or situation.

8 Claims, 18 Drawing Sheets

(a)                              (b)

METHOD AND APPARATUS FOR PROVIDING VIDEO INFORMATION

CROSS-REFERENCE TO RELATED APPLICATIONS

This patent application claims the benefit of Korean Patent Application No. 10-2019-0167998 filed on Dec. 16, 2019, which is hereby incorporated by reference in its entirety into this application.

1. FIELD

The present disclosure relates to a method and apparatus for providing video information. More specifically, it relates to a method and apparatus for providing video information for streaming video content between remote terminal devices.

2. DESCRIPTION OF THE RELATED ART

As high-speed network infrastructure such as 5G is established, expectations for the digital media market that transmit video contents, etc. are increasing. Technologies that were previously difficult to commercialize due to lack of network infrastructure are being actively developed as related infrastructures are being established, and as one of them, interest in the 3D object sharing technology used in augmented reality service or virtual reality service by sharing video data between remote terminals is increasing.

A representative service that utilizes 3D object sharing technology is a remote advisory service that seeks advice from a remote expert on a certain problem. For example, when a problem that is difficult for field workers to solve occurs in facilities or equipment, a video of filming the location where the problem occurs is streamed to a remote expert, and a remote expert watches the streamed video and advises for solving the problem. In order to convey the advice content more clearly, remote experts can draw or write a 3D object type picture on the streamed video and convey it to field workers.

However, in the case of generating and replying a 3D object as described above, conventionally, the 3D object is displayed on the same screen position on the receiver's screen according to the position on the screen where the sender displays the 3D object. For this reason, when the receiver's screen is changed during 3D object transmission, the 3D object is frequently displayed at a location different from the location originally intended by the sender. For example, if the sender generates and transmits a 3D object for subject A, but the receiver moves and the streamed video is changed to the screen of subject B, the 3D object previously generated for subject A is displayed on subject B, which causes confusion of the receiver.

SUMMARY

A technical problem to be solved through some embodiments of the present disclosure is to provide a method and apparatus for providing video information capable of positioning a shared 3D object at an accurate point even when a streaming screen continuously changes.

Another technical problem to be solved through some embodiments of the present disclosure is to provide a method and apparatus for providing video information capable of providing objective position information of a 3D object irrespective of a surrounding environment or situation.

The technical problems of the present disclosure are not limited to the technical problems mentioned above, and other technical problems that are not mentioned will be clearly understood by those skilled in the art from the following description.

According to aspects of the present disclosure, there is provided a method for providing video information, the method is performed by a computing device and comprises rendering a video frame, displaying an object generated by user manipulation on the rendered video frame, calculating a relative position of the object with respect to a reference point of the video frame, and transmitting object information generated based on the relative position of the object.

According to other aspects of the present disclosure, there is provided a method for providing video information, the method is performed by a computing device and comprises receiving position information of an object, determining a position on the video frame to render the object based on a relative position between a point on spatial coordinates indicated by the position information and a reference point of a video frame, and rendering the object at the determined position.

According to aspects of the present disclosure, there is provided an apparatus for providing video information, the apparatus comprises a processor, a memory for loading a computer program executed by the processor, and a storage for storing the computer program, wherein the computer program includes instructions for performing operations comprising, rendering a video frame, displaying an object by user manipulation on the rendered video frame, calculating a relative position of the object with respect to a reference point of the video frame, and providing object information generated based on the relative position of the object.

According to various aspects of the present disclosure described above, when video is streamed between remote terminals, a shared 3D object may be positioned at an accurate point even if the streaming screen is continuously changed.

Further, since objective position information of shared 3D objects can be provided irrespective of the surrounding environment or situation, it can be effectively used in various application cases such as processing video with 3D objects or combining 3D objects with other video.

Various effects according to the present disclosure are not limited to the technical effects mentioned above, and other technical effects not mentioned will be clearly understood by those skilled in the art from the following description.

DETAILED DESCRIPTION

Figure 1:
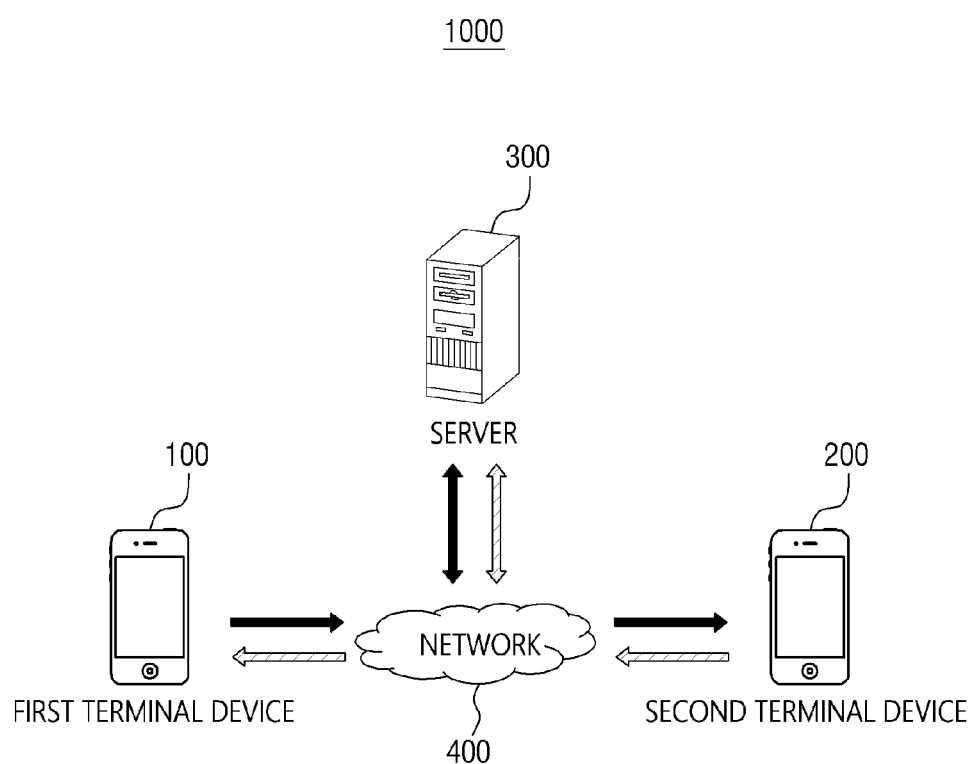
FIG. 1 is a diagram illustrating an exemplary system environment, to which a method and apparatus for providing video information according to the present disclosure are applied.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings, in addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a diagram conceptually illustrating a service environment to which a method and apparatus for providing video information according to the present disclosure are applied. Referring to FIG. 1, a service environment 1000 includes a first terminal device 100, a second terminal device 200, a server 300, and a network 400. However, here, the server 300 is an optional component and may be excluded from the service environment 1000 in the case of providing video information in a peer-to-peer manner.

The first terminal device 100 is a device that generates video and streams it to the second terminal device 200. In this case, the first terminal device 100 may determine a reference point of a streamed video frame and provide the reference point together when streaming video. In this case, the reference point represents a position on spatial coordinates of a viewpoint on the video frame looking at objects in the video frame, and the reference point will be described in more detail later in or below FIG. 2.

The second terminal device 200 renders video streamed from the first terminal device 100 and displays it on the screen. And, the second terminal device 200 generates a 3D object by a user's manipulation, and displays the generated 3D object in a rendered streaming video. In this case, the second terminal device 200 may calculate objective position information of the 3D object displayed on the streaming video and then reply it to the first terminal device 100 as object information. A method of calculating the position information of the 3D object will be described in detail later in or below FIG. 8.

Meanwhile, the first terminal device 100 receives object information replied by the second terminal device 200 and displays a 3D object on the currently rendered video frame. In this case, the content of the displayed 3D object may be determined according to the rendering information included in the object information, and the position of the 3D object on the video frame may be determined according to the position information included in the object information.

According to the above described configurations of the present disclosure, since objective position information is provided together when 3D objects are shared between remote terminals, a 3D object can be placed at the accurate point even if the screen displayed on the terminal is different from when the 3D object was generated. Further, by using the objective position information of the provided 3D object, it can be used in various application cases such as processing video including a 3D object or combining the provided 3D object with another video.

Hereinafter, a method and apparatus for providing video according to the present disclosure will be described with reference to the drawings along with specific embodiments.

Figure 2:
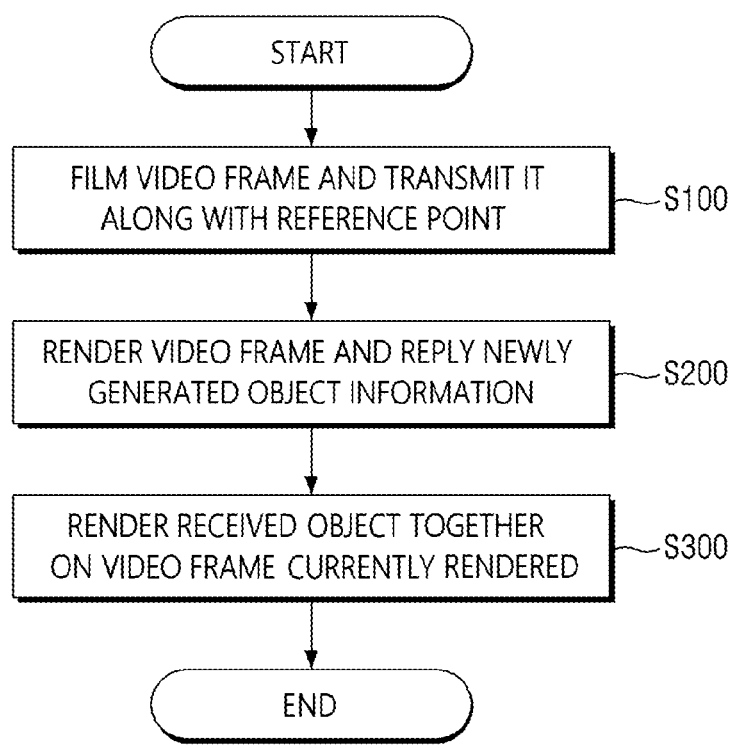
FIG. 2 is a flowchart illustrating a method for providing video information according to some embodiments of the present disclosure.

FIG. 2 is a flowchart illustrating a method of providing video information according to some embodiments of the present disclosure. Referring to FIG. 2, the method of providing video information includes steps S100, S200, and S300. In this case, in the system environment 1000 illustrated in FIG. 1, steps S100 and S300 may be performed by the first terminal device 100, and step S200 may be performed by the second terminal device 200.

In step S100, the first terminal device 100 films a video frame and transmits it together with a reference point. In this case, the reference point represents a position on spatial coordinates of a viewpoint on a video frame looking at objects in the video frame, and the reference point may be different for each video frame. The first terminal device 100 may determine a reference point corresponding to each video frame and provide the video frame and the determined reference point together.

In step S200, the second terminal device 200 renders the transmitted video frame. Then, a 3D object is newly generated and displayed on the rendered video frame according to user manipulation. As an embodiment, the 3D object generated and displayed at this time may be a picture or a writing written by the user, or may be an object generated by duplicating a previously stored object.

And, in order to provide objective position information of the 3D object generated by the first terminal device 100, the second terminal device 200 calculates a relative position between the reference point of the video frame and the 3D object, and based on this, calculates the objective position information of the 3D object. Since the reference point represents a specific point on fixed spatial coordinates, when a relative position between the 3D object and the reference point is calculated, the position of the 3D object on spatial coordinates can be derived therefrom. Since such position on the spatial coordinates represents a global position that does not change, it can be used as objective position information of the 3D object.

The second terminal device 200 replies the calculated position information of the 3D object as object information to the first terminal device 100. In this case, the second terminal device 200 may reply rendering information of the 3D object as the object information together. The rendering information may be information including graphic data for directly generating a 3D object by the first terminal device 100, or may be information indicating a specific 3D object previously shared between each other.

In step S300, the first terminal device 100 renders the 3D object on the currently rendered video frame by referring to the received object information. In this case, the rendered video frame may be different from the video frame displayed when the second terminal device 200 generates the 3D object. Even in such a case, since the first terminal device 100 can know the objective position information of the 3D object from the object information, it renders the 3D object at the corresponding point on the current video frame, thereby displaying the 3D object at the originally intended accurate position.

Figure 3:
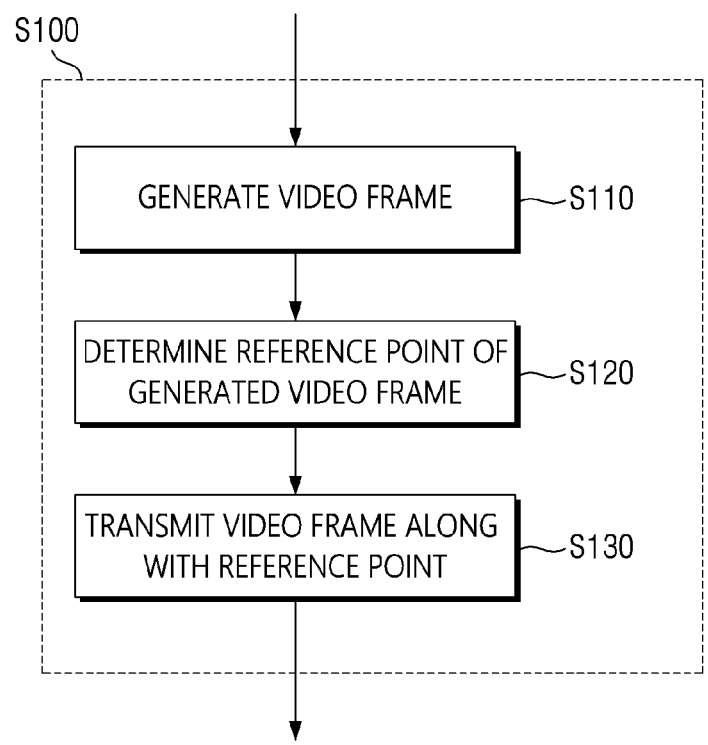
FIG. 3 is a flowchart illustrating an exemplary embodiment of transmitting the video frame and the reference point of FIG. 1 (S100).

FIG. 3 is a flowchart illustrating an exemplary embodiment of transmitting the video frame and the reference point of FIG. 1 (S100).

Figure 4:
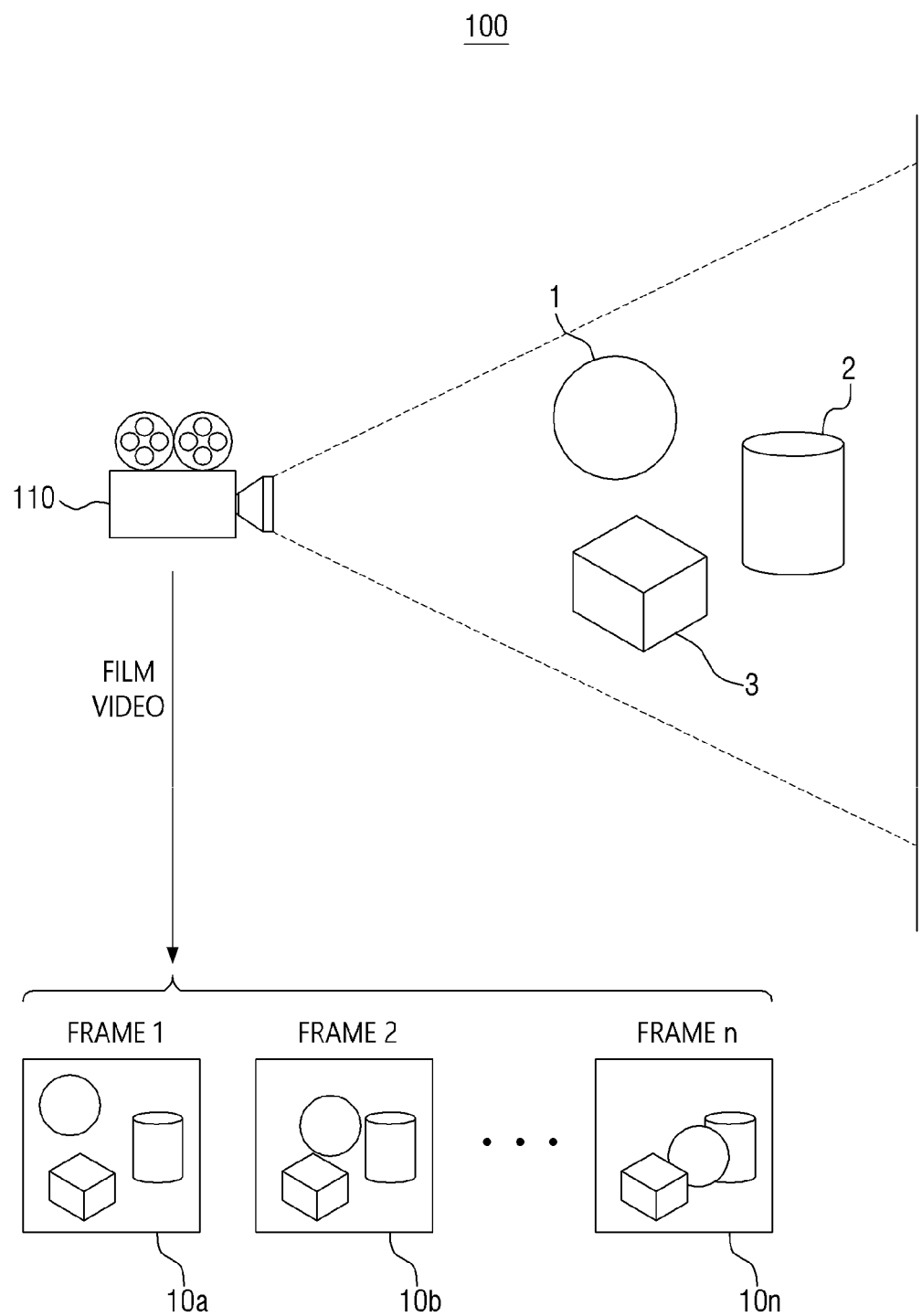
FIG. 4 is a diagram describing a method of generating video frames by filming a subject.

In step S110, the first terminal device 100 films a subject and generates video frames to be streamed. An exemplary embodiment of generating the video frames is shown in FIG. 4. Referring to FIG. 4, a case, in which a plurality of subjects 1, 2, 3 exist in an actual space, and a plurality of video frames 10a, 10b, 10n are generated by filming video through the camera 110 is shown. In this case, the camera 110 may be a camera built into the first terminal device 100, or may be a camera connected to the first terminal device 100 through a network as a separate independent camera. The plurality of frames 10a, 10b, and 10n may be frames sequentially filmed according to a time order. Referring to FIG. 4, the spherical subject 1 is positioned at the upper left of the frame 1 in frame 1 (10a), but it can be seen that it gradually moves toward the lower left in frames 2 and 3 (10b, 10n) by moving the camera or moving the subject 1.

In step S120, the first terminal device 100 determines a reference point of the generated video frame. In this case, the reference point of the video frame indicates a position in spatial coordinates of a viewpoint on the video frame looking at objects in the video frame. When the camera 110 films the video frame, it corresponds to a position in spatial coordinates of the camera's viewpoint looking at the subject 1, 2, 3.

As an example, the spatial coordinates may be three-dimensional spatial coordinates with a position of the camera 100 at the moment when the streaming video is first filmed as an origin. In this case, the reference point of the first frame 10a becomes the origin $\{0, 0, 0\}$.

Figure 5:
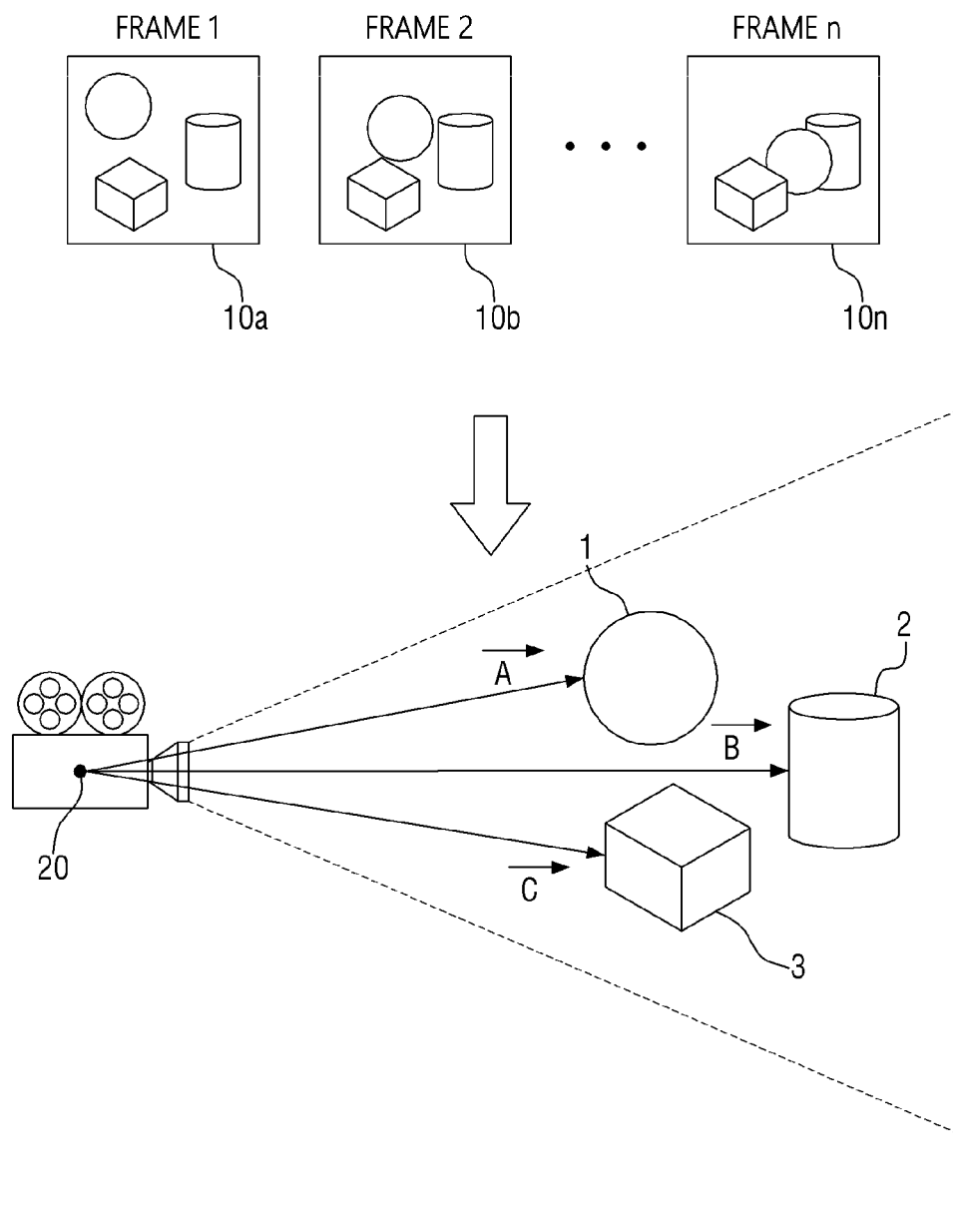
FIG. 5 is a diagram describing a method of calculating a relative position between a reference point of a video frame and objects in the video frame based on the generated video frame.
Figure 6:
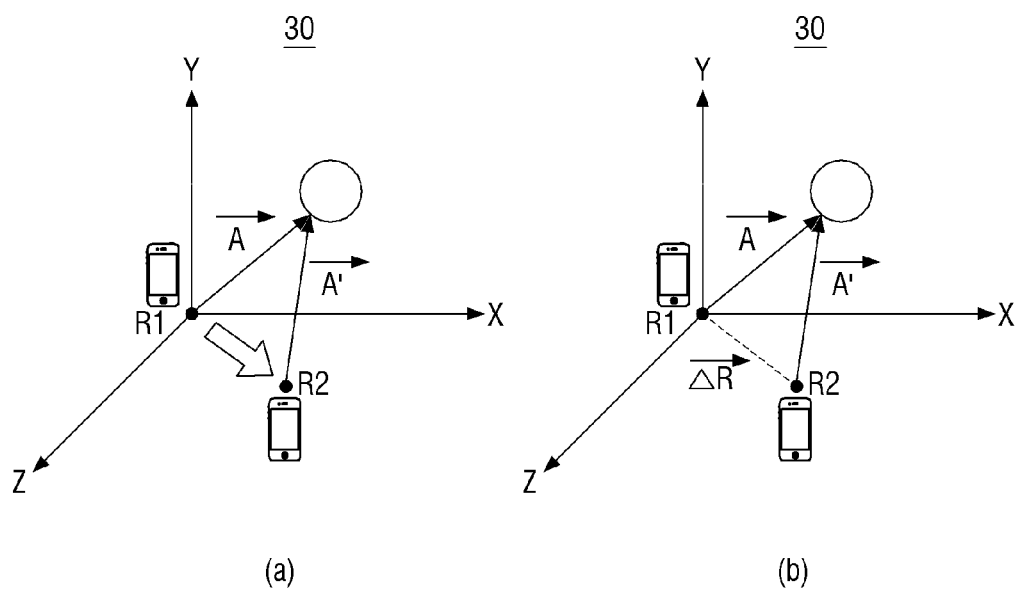
FIG. 6 is a diagram illustrating an embodiment of determining a reference point of a video frame.

Meanwhile, the reason for determining the reference points of the video frames as described above is to calculate objective position information (i.e., position in spatial coordinates) of objects in the video frame. FIGS. 5 and 6 are referred to describe this.

In general, the filmed video frame itself is a flat image, but by analyzing the direction, position, and depth recognized in the video, a relative position with a viewpoint of viewing objects in the video may be recognized. For example, as shown in FIG. 5, when the filmed video frames 10a, 10b, and 10n are analyzed, the relative positions (A, B, C, at this time, A, B, C means a vector) between the viewpoint position 20 of the camera at the filming timing and the subject 1, 2, 3 can be calculated. A technology for calculating a three-dimensional relative position from a planar image is a general technology that is commonly applied to augmented reality engines at present, and is widely known in the art, so a description thereof will be omitted here. Meanwhile, it has already been described above that the viewpoint position 20 of the camera corresponds to the reference point of the corresponding video frame.

Therefore, if only the reference point of the video frame is known, the relative position between the reference point and the objects can be calculated through analysis of the video frame, and as a result, the position of the objects in spatial coordinates can be calculated.

FIG. 6 shows a specific embodiment of determining a reference point. In the embodiment of FIG. 6, the reference point is determined as the reference point of the first frame of the streamed video as the origin $\{0, 0, 0\}$, but subsequent frames can be determined by detecting the movement direction and size of the camera 110 and reflecting the change to the existing reference point.

Referring to FIG. 6, a viewpoint position of a camera (here, exemplified as a camera built into a terminal device) at the time of filming the first frame is R1. At this time, if the spatial coordinate 30 is determined with the position of R1 as the origin $\{0, 0, 0\}$, the reference point of the first frame is determined as $\{0, 0, 0\}$ accordingly. Thereafter, as the camera moves, the viewpoint position of the camera changes to R2 (a), and a second frame is filmed at the position of R2. The reference point of the second frame is determined as the coordinates obtained by adding the motion vector ΔR of the camera viewpoint to the reference point of the first frame (b). The motion vector ΔR can be easily calculated through a sensing value of a gyro sensor or a position sensor built into the terminal device. In this way, the reference point of each video frame can be determined.

According to the above embodiment, it is possible to calculate objective position information of an object in a video frame regardless of the viewpoint position of the camera. For example, in FIG. 6, although the relative position of the subject 1 grasped from the filmed video frame is different from the viewpoint positions R1 and R2 as vectors A and A', respectively, the position on the spatial coordinates of the subject 1 calculated by reflecting the reference point of each video frame becomes the same as A=A'+ΔR. Therefore, if only the reference point of the video frame is provided, it is possible to calculate objective position information of objects in the video frame.

Figure 7:
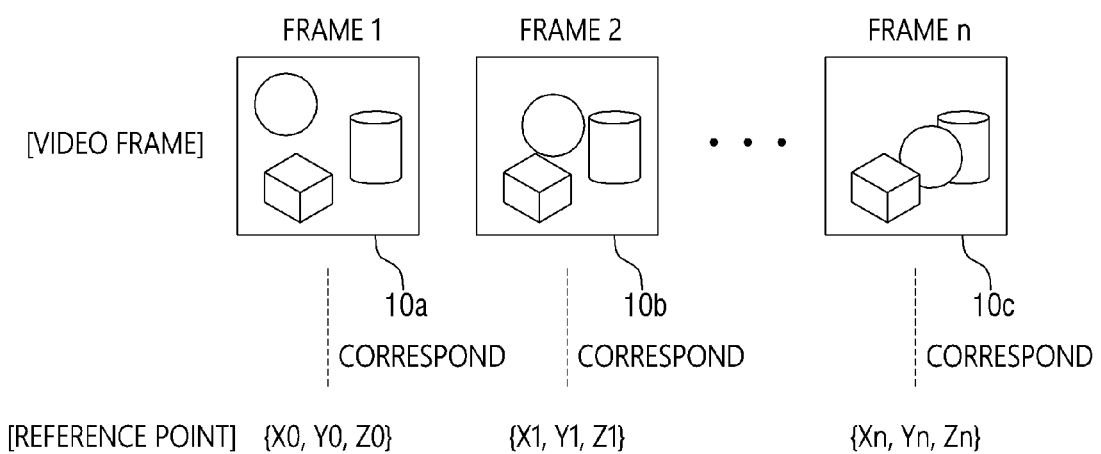
FIG. 7 is a diagram illustrating an exemplary form of a generated transmitted video frame and a reference point.

Returning back to FIG. 3, in step S130, the first terminal device 100 transmits the generated video frame together with its reference point to the second terminal device 200. FIG. 7 illustrates an exemplary form of a transmitted video frame and a reference point. Referring to FIG. 7, an example of determining reference points {X0, Y0, Z0}, {X1, Y1, Z1}, {X2, Y2, Z2} to correspond one-to-one to each of a plurality of frames 10a, 10b, and 10n is shown. The first terminal device 100 transmits reference point {X0, Y0, Z0}, {X1, Y1, Z1}, {X2, Y2, Z2} of each frame together with each frame 10a, 10b, and 10n to the second terminal device 200.

Figure 8:
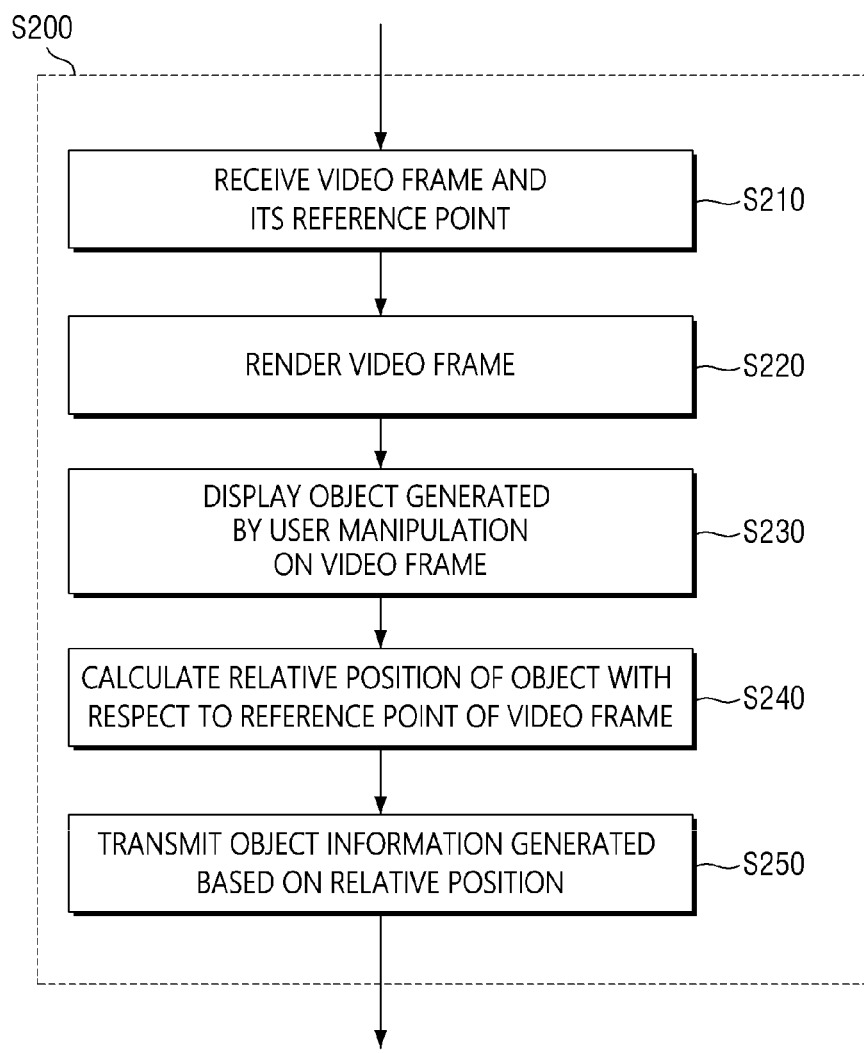
FIG. 8 is a flow chart illustrating an exemplary embodiment of rendering the video frame of FIG. 1 and replying object information (S200).

FIG. 8 is a flow chart illustrating an exemplary embodiment of rendering the video frame of FIG. 1 and replying object information (S200). As mentioned above, the embodiment of FIG. 8 is performed by the second terminal device 200 that receives the streaming video.

In step S210, the second terminal device 200 receives a video frame and a reference point of the video frame from the first terminal device 100.

In step S220, the second terminal device 200 renders the received video frame and displays it to the user.

Figure 9:
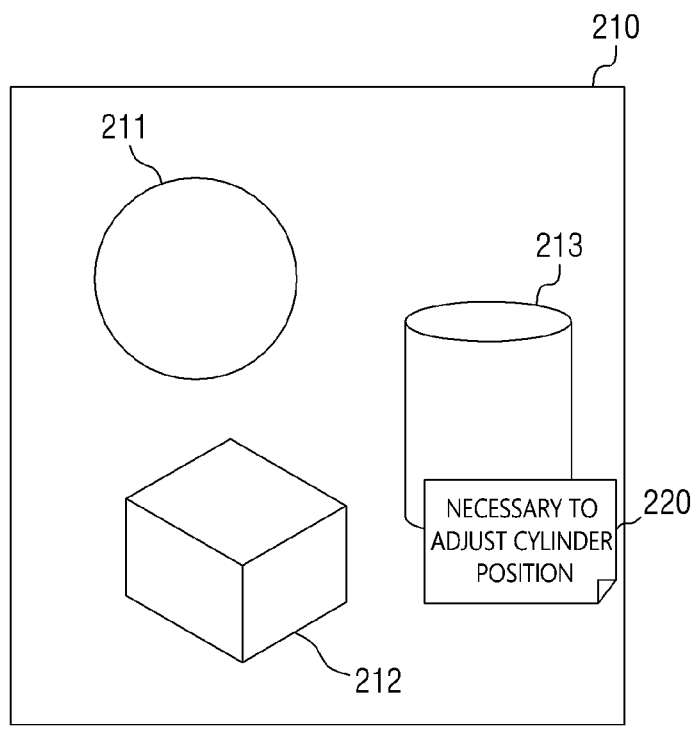
FIG. 9 is a diagram illustrating an embodiment of displaying a 3D object on a rendered video frame.

In step S230, the second terminal device 200 generates and displays a 3D object according to a user manipulation on the rendered video frame. A specific example of this will be described with reference to FIG. 9. FIG. 9 is a diagram illustrating an embodiment of displaying a 3D object on a rendered video frame.

In FIG. 9, the second terminal device 200 renders a video frame 210 including objects 211, 213, and 212. Then, in response to a user manipulation to display the 3D object, the 3D object 220 is generated and displayed on the video frame 210. In this case, the 3D object may be a picture or writing that the user directly writes on the video frame 210, or may be an object generated by duplicating an object previously stored through a menu provided by the second terminal device 200. For example, in order to guide the user of the remote first terminal device 100 to adjust the position of the cylinder, the user may generate and display the notepad object 220 near the cylinder object 213.

In step S240, the second terminal device 200 calculates a relative position to the reference point of the video frame 210 for the object generated by the user. As described above, if the relative position between the reference point and the object in the video frame can be known in addition to the reference point of the video frame, objective position information of the corresponding object can be calculated. Since the reference point of the video frame 210 is already known (that is, since it was previously received from the first terminal device 100), the relative position with the reference point is calculated in order to know the objective position information of the newly generated object 220.

Figure 10:
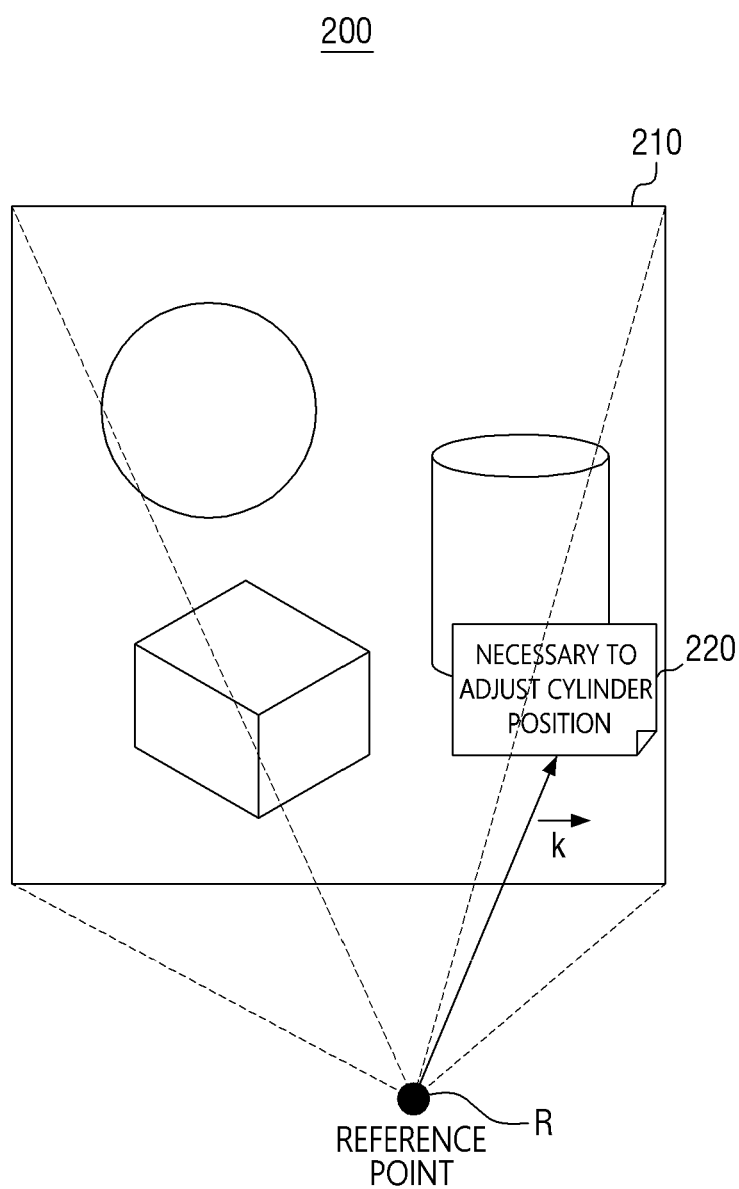
FIG. 10 is a diagram conceptually describing a method of calculating a relative position between a 3D object displayed in FIG. 9 and a reference point of a video frame.

Referring to FIG. 10, a specific example of calculating a relative position between a generated object 220 and a reference point of a video frame 210 is shown. In FIG. 10, when the object 220 is displayed at a specific position on the video frame 210, a relative position (vector k) between the reference point R and the object 220 can be calculated by analyzing the relative position and depth of the object 220 viewed from the reference point R. Since a method of calculating a three-dimensional relative position of an object in video from the video is widely known in the art, a detailed description thereof will be omitted.

In step S250, the second terminal device 200 generates object information based on the calculated relative position, and transmits the generated object information to the first terminal device 100. As an embodiment, the second terminal device 200 may calculate a position in spatial coordinates of the object 220 based on the calculated relative position, and transmit the calculated position in spatial coordinates as object information. Alternatively, the second terminal device 200 may transmit the calculated relative position of the object 220 and the reference point of the video frame 210 as object information without calculating the position of the object 220 on spatial coordinates. As an embodiment, the second terminal device 200 may further transmit rendering information of the object 220 as the object information to the first terminal device 100. In this case, the rendering information may be information including graphic data for directly generating a 3D object by the first terminal device 100, or may be information indicating a specific 3D object previously shared between each other.

Figure 11:
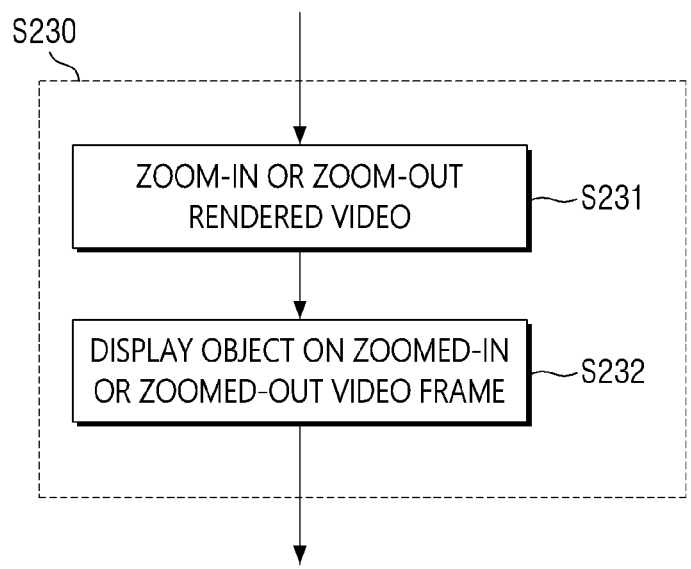
FIG. 11 is a flowchart illustrating an exemplary embodiment of displaying an object on the video frame of FIG. 8 (S230).

FIG. 11 is a flowchart illustrating an exemplary embodiment, in which the step S230 of displaying an object on the video frame of FIG. 8 is further detailed. In the embodiment of FIG. 11, an embodiment, in which the video frame 210 is zoomed-in or zoomed-out and then the object 220 is generated and displayed, is described.

In step S231, the second terminal device 200 zooms-in or zooms-out the rendered video frame 210. The zoom-in or zoom-out may be performed in response to the user manipulation.

In step S232, the second terminal device 200 generates and displays the object 220 on the zoomed-in or zoomed-out video frame 210 by user manipulation. In this way, when the zoom-in or zoom-out function is provided, the user may more easily display the object 220 at a position on the video frame 210 that he or she intends.

Figure 12:
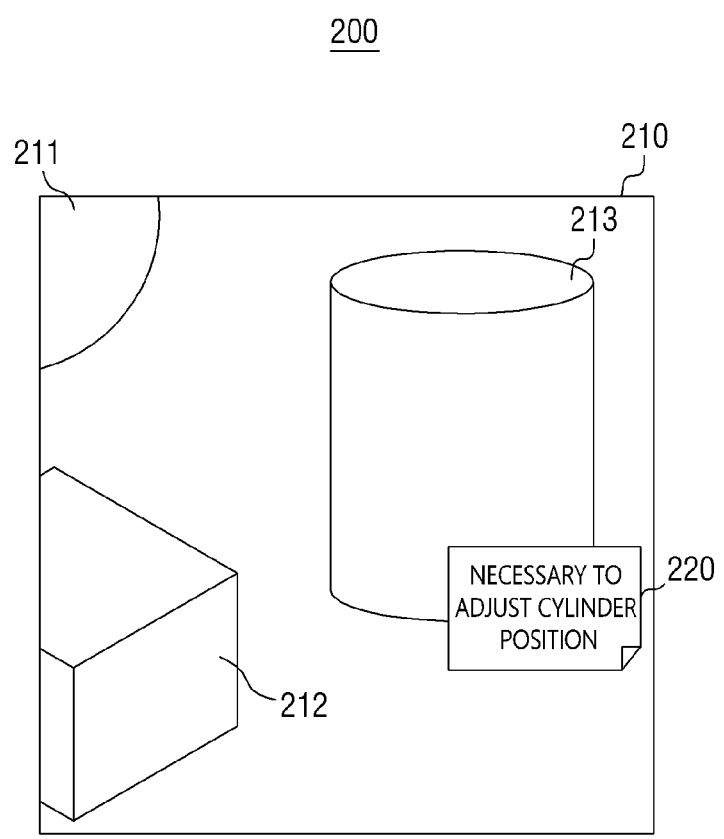
FIG. 12 is a diagram illustrating an exemplary case, in which a 3D object is displayed according to the method of FIG. 11.

As an example, an example of displaying the object 220 on the zoomed-in video frame 210 is shown in FIG. 12. Referring to FIG. 12, it can be seen that the zoomed-in video frame 210 is provided and the memo object 220 is displayed thereon so that the memo object 220 can be more accurately positioned near the cylinder object 213.

Figure 13:
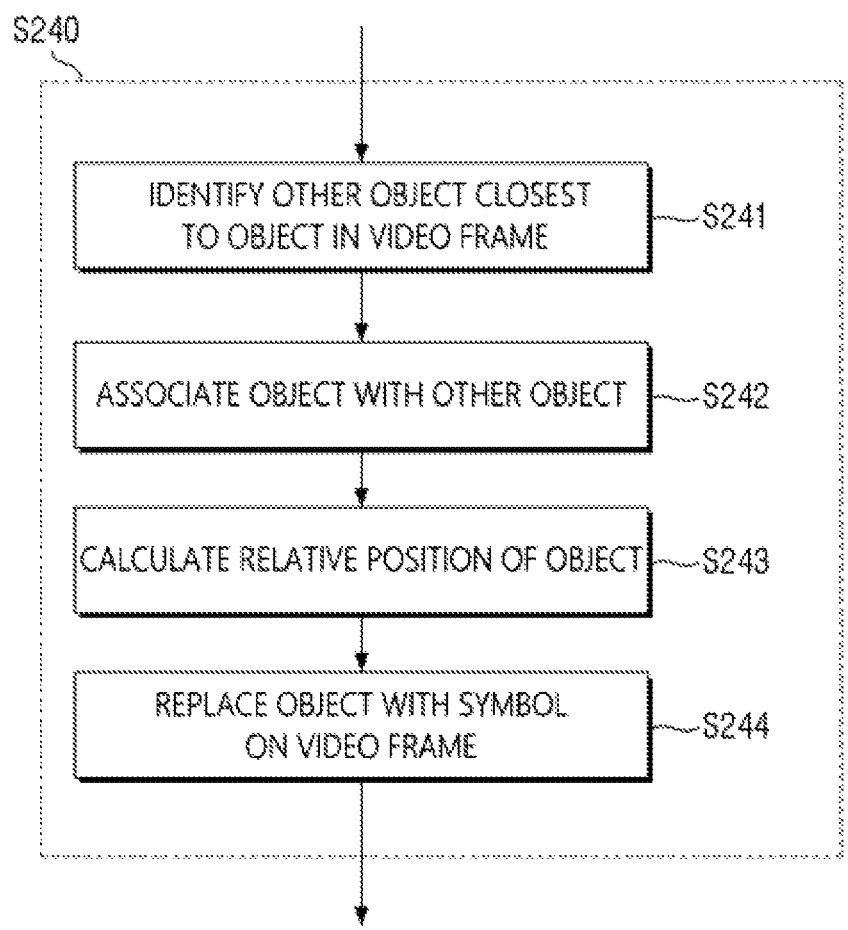
FIG. 13 is a flowchart illustrating an exemplary embodiment of calculating the relative position of the object of FIG. 8 (S240).

FIG. 13 is a flowchart illustrating an exemplary embodiment, in which the step S240 of calculating the relative position of the object of FIG. 8 is further detailed. In FIG. 13, an embodiment, in which the second terminal device 200 recognizes the object 220 displayed on the video frame 210, identifies other object closest to the object 220, and associates it with each other, will be described. In general, there is a high possibility that the object 220 generated by the user is associated with a specific object in the video frame. In this case, according to the present embodiment, the generated object 220 can be effectively managed and viewed by associating the generated object 220 with other related objects.

In step S241, the second terminal device 200 identifies other object closest to the object 220 generated and displayed by a user manipulation in the video frame 210.

In step S242, the second terminal device 200 associates the object 220 with the identified other object. Here, the meaning of association means making a specific relationship between the object 220 and the other object. For example, it may mean setting the object 220 as a sub-object of the other object, setting a link between the object 220 and the other object that can be viewed, setting a common keyword between the object 220 and the other object, or adding an object ID between the object 220 and the other object as another tag information.

Figure 14:
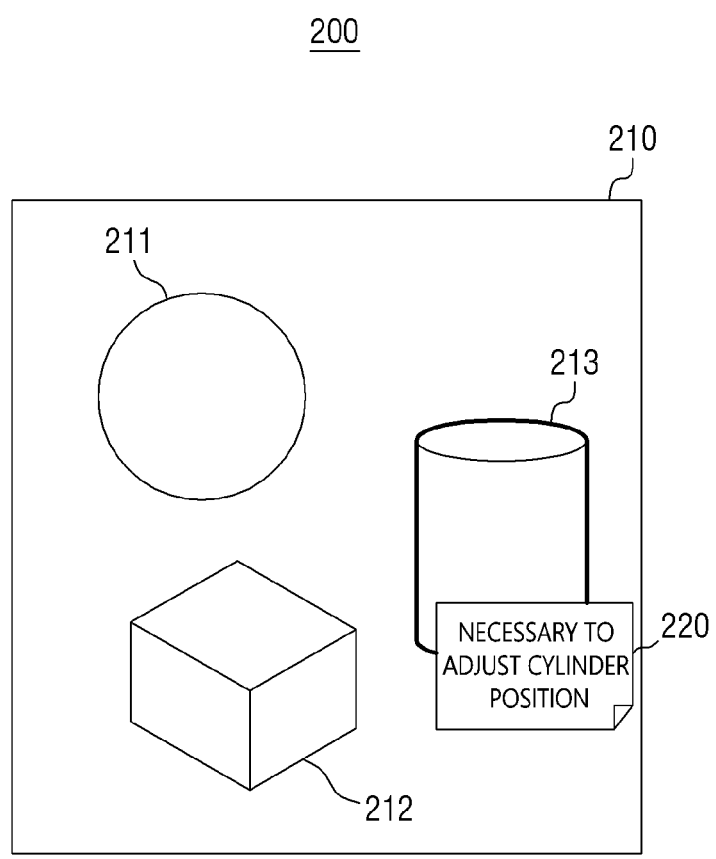
FIG. 14 is a diagram exemplary describing a method of associating a 3D object with other adjacent object.

An embodiment related to this is shown in FIG. 14. Referring to FIG. 14, it can be seen that the second terminal device 200 identifies the other object 213 that is closest to the object 220 in the video frame 210 and associates the other object 213 with the object 220 with each other. In this way, if the object 220 is associated with the other object 213, it can be usefully utilized in various forms. For example, by searching for the other object 213 within whole video frames, the object 220 can be collectively displayed in other video frames, or a plurality of objects 220 and 213 can be edited or managed like a single object by referring to associated information.

Returning to FIG. 13, in step S243, the second terminal device 200 calculates the reference point of the video frame 210 and the relative position of the object 220. In this case, the second terminal device 200 may determine that the relative position of the object 220 not to be separated by more than a predetermined distance from the associated other object. This is to increase the readability of the object 220 by allowing associated objects to be located in close proximity to each other.

Figure 15:
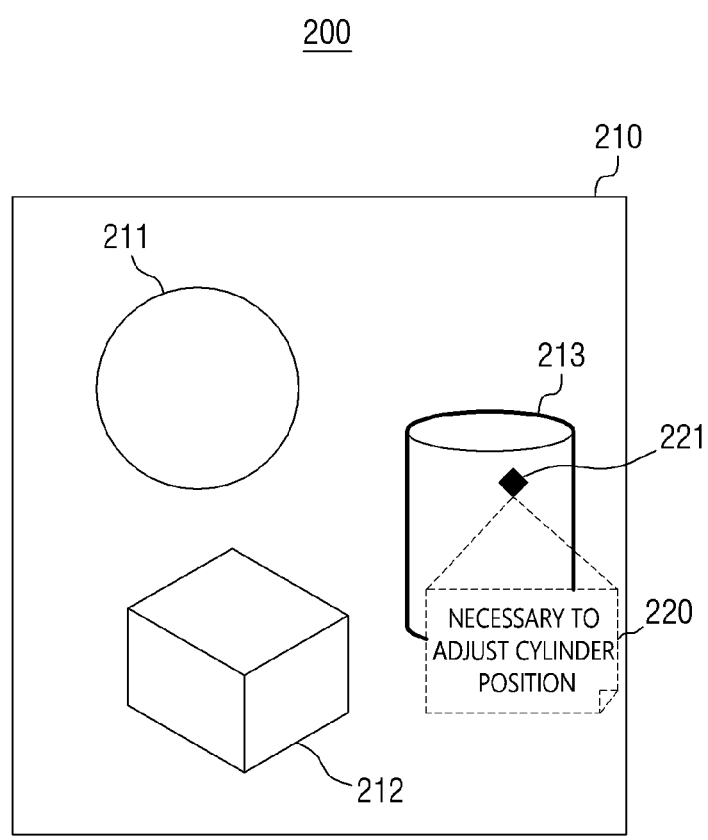
FIG. 15 is a diagram illustrating a specific embodiment of replacing a 3D object with a symbol on a video frame.

In step S244, the second terminal device 200 replaces the object 220 with a symbol on the video frame 210. An embodiment of step S244 will be described with reference to FIG. 15. Referring to FIG. 15, it can be seen that the object 220 disappears and a symbol 221 is newly generated on the associated other object 213. When a plurality of 3D objects are newly generated on the video frame 210, it may be necessary to abbreviate the newly generated objects in the form of symbols in order to increase readability and to clearly identify the objects. In this case, the object 220 generated according to the user's selection may be abbreviated to a symbol 221 and replaced. In this case, the replaced symbol 221 may be displayed on the other object 213 to indicate that the 3D object 220 associated with the other object 213 exists. In this case, when the symbol 221 is clicked, the original object 220 may be displayed on the video frame 210 again.

Meanwhile, as an embodiment, when receiving a plurality of video frames, the second terminal device 200 may mix and combine the plurality of video frames based on a position on spatial coordinates identified from the video frames to construct a three-dimensional virtual space containing objects in the video frame.

Figure 16:
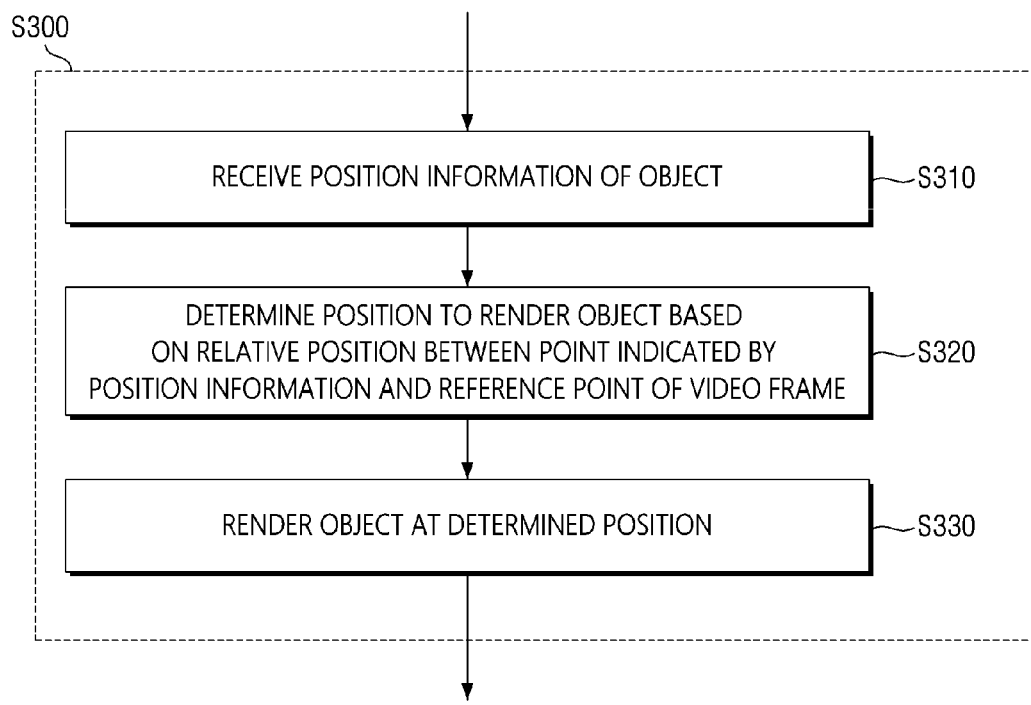
FIG. 16 is a flowchart illustrating an exemplary embodiment of rendering the received object of FIG. 1 together (S300).

FIG. 16 is a flowchart illustrating an exemplary embodiment of rendering the received object of FIG. 1 together (S300). As described above, the embodiment of FIG. 16 is performed after the first terminal device 100 receives object information from the second terminal device 200.

In step S310, the first terminal device 200 receives the position information of the object previously calculated in step S200.

In step S320, the first terminal device 200 determines a position to render the object in the currently rendered video frame based on a relative position between a point indicated by the received position information and a reference point of a currently rendered video frame. For example, the first terminal device 200 may determine a relative position between reference points of the rendered video frame by identifying the position of the object 220 in spatial coordinates from the received position information and obtaining the difference between the identified position in the spatial coordinates and the reference point of the currently rendered video frame.

In step S330, the first terminal device 200 renders the object at the determined position. In this case, the first terminal device 200 may extract and use the rendering information of the object from the object information received from the second terminal device 200.

Figure 17:
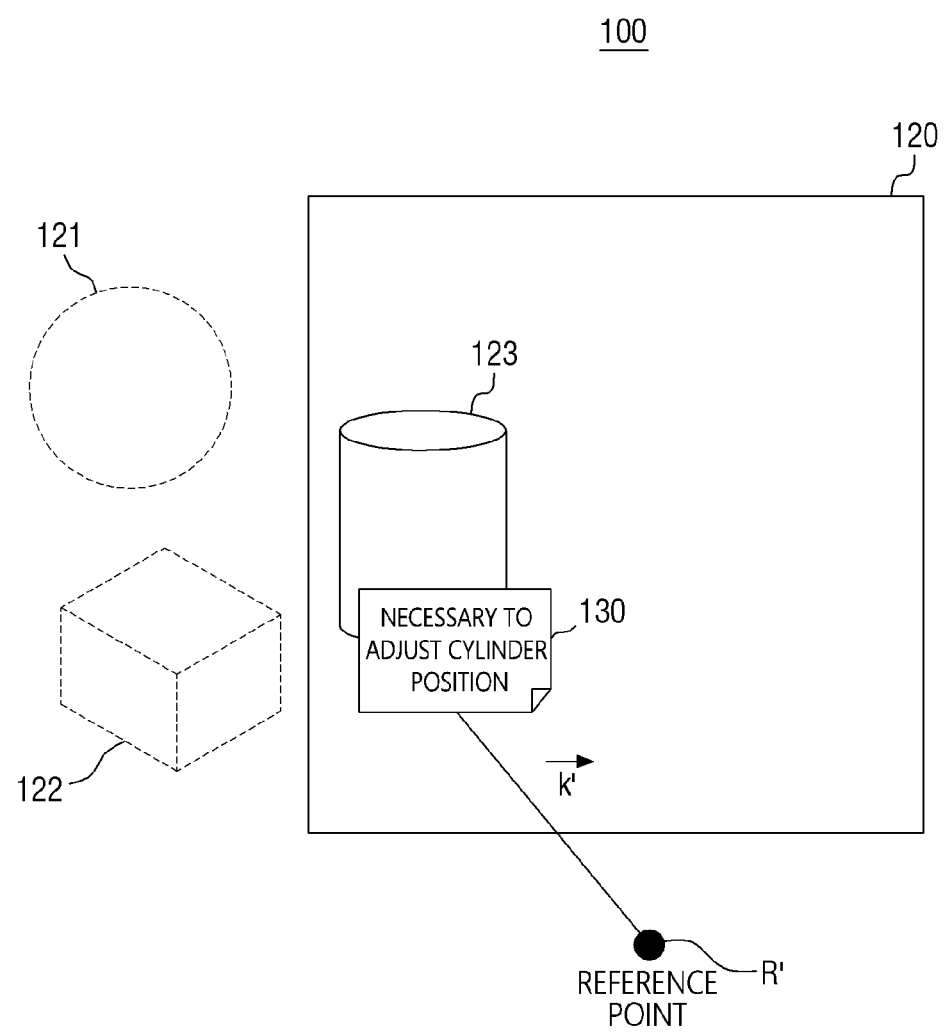
FIG. 17 is a diagram illustrating an exemplary case of displaying a 3D object received according to the method of FIG. 16 on a currently rendered video frame.

FIG. 17 shows an exemplary case of displaying a 3D object received according to the method of FIG. 16 on a currently rendered video frame. In FIG. 17, a camera viewpoint is moved than before, and a video frame different from the viewpoint at which the second terminal device 200 generated the object 220 is being rendered, but since the relative position with a new reference point (R') is calculated based on the objective position information of the object 220, it can be confirmed that the object 220 is displayed at an accurate position even on the currently rendered video frame 120.

Meanwhile, the video frame 120 on which the object 220 of FIG. 17 is displayed may be a video frame previously generated rather than a currently filmed video frame. In this embodiment, since the object 220 is displayed based on its objective position information, the object 220 can be displayed on the video frame 120 as long as there is only the reference point (R) information of the video frame 120 even if the video frame 120 has been previously generated, or even if it has been generated before the second terminal device 200 generates the object 220.

Hereinafter, an exemplary computing device 500 that can implement an apparatus and a system, according to various embodiments of the present disclosure will be described with reference to FIG. 18.

Figure 18:
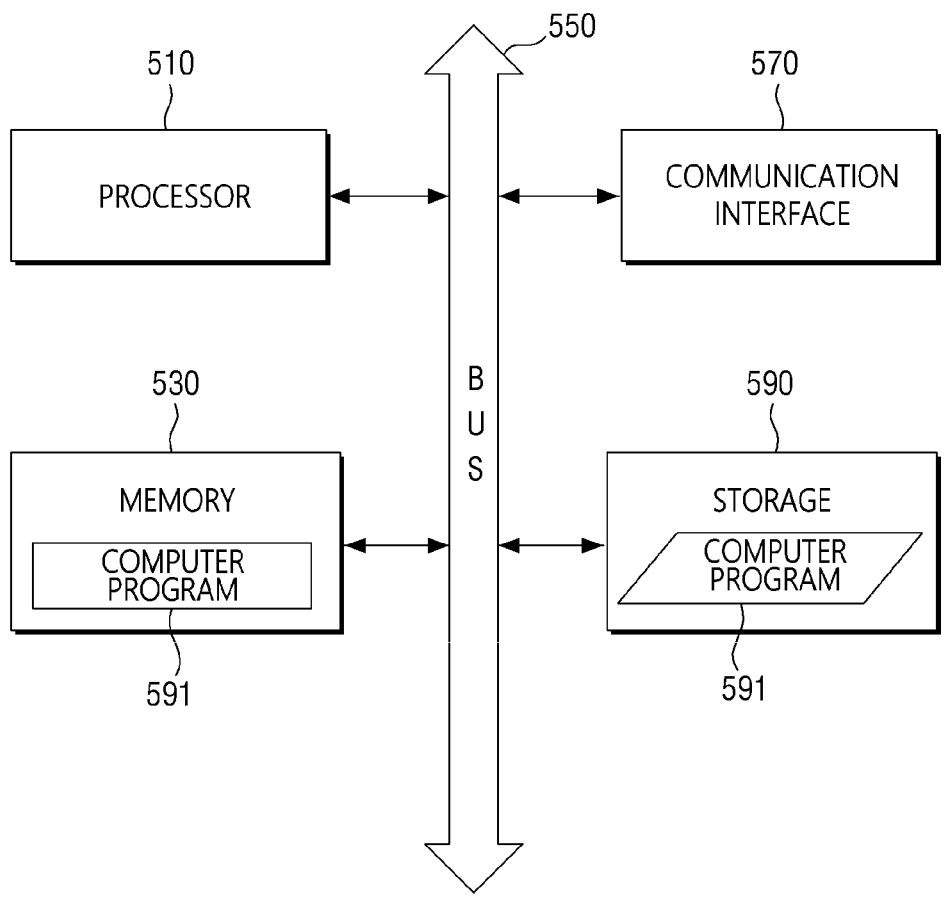
FIG. 18 is a diagram illustrating a hardware configuration of an exemplary computing device 500 that can implement the methods described in various embodiments of the present disclosure.

FIG. 18 is an example hardware diagram illustrating a computing device 500.

As shown in FIG. 18, the computing device 500 may include one or more processors 510, a bus 550, a communication interface 570, a memory 530, which loads a computer program 591 executed by the processors 510, and a storage 590 for storing the computer program 591. However, FIG. 18 illustrates only the components related to the embodiment of the present disclosure. Therefore, it will be appreciated by those skilled in the art that the present disclosure may further include other general purpose components in addition to the components shown in FIG. 18.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/ operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. For example, when the computer program 591 is loaded into the memory 530, the logic (or the module) as shown in FIG. 4 may be implemented on the memory 530. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented.

An example, the computer program 591 may include instructions to conduct an operation for rendering a video frame, an operation for displaying an object generated by user manipulation on the rendered video frame, an operation for calculating a relative position of the object with respect to a reference point of the video frame, and an operation for transmitting object information generated based on the relative position of the object.

Another example, the computer program 591 may include instructions to conduct an operation for receiving position information of an object, an operation for determining a position on the video frame to render the object based on a relative position between a point on spatial coordinates indicated by the position information and a reference point of a video frame, and an operation for rendering the object at the determined position.

When the computer program 591 is loaded on the memory 530, the processor 510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method for providing video information, the method being performed by a computing device comprising a first terminal device and a second terminal device, the method comprising:
    generating video frames by the first terminal device;
    determining a reference point of one of the video frames and determining reference points of the other video frames as coordinates obtained by adding a motion vector of a camera viewpoint to the reference point of the one of the video frames;
    transmitting the video frames along with the reference points thereof from the first terminal device to the second terminal device;
    receiving and rendering the video frames by the second terminal device;
    displaying an object generated by user manipulation on at least one of the video frames rendered by the second terminal device;
    calculating a relative position of the object with respect to the reference point of the at least one of video frames;
    transmitting object position information generated based on the relative position of the object from the second terminal device to the first terminal device;
    receiving the object position information by the first terminal device;
    determining a position of the object on a video frame which is rendered on the first terminal device, based on the relative position between a point on spatial coordinates indicated by the object position information and the reference point of the video frame which is rendered on the first terminal device; and
    rendering the object at the determined position on the video frame which is rendered on the first terminal device.

2. The method of claim 1, wherein the reference point of the video frame represents a position on spatial coordinates of a viewpoint on the video frame looking at objects in the video frame.

3. The method of claim 1, wherein the object information comprises rendering information of the object and position information of the object.

4. The method of claim 1, wherein displaying an object comprises:
    zooming-in or zooming-out the rendered video frame; and
    displaying the object on the zoomed-in or zoomed-out video frame.

5. The method of claim 1, further comprising:
    constructing a three-dimensional virtual space including objects in the video frame by using the video frame.

6. The method of claim 1, wherein calculating a relative position of the object comprises:
    identifying other object closest to the object in the video frame; and
    associating the object with the other object, wherein the relative position of the object is determined not to be separated by more than a predetermined distance from the other object.

7. The method of claim 6, wherein calculating a relative position of the object further comprises replacing the object with a symbol on the video frame.

8. An apparatus comprised of a first terminal device and a second terminal device for providing video information, the apparatus comprising:
- a processor;
- a memory for loading a computer program executed by the processor; and
- a storage for storing the computer program,
- wherein the computer program includes instructions for performing operations comprising:
- generating video frames by the first terminal device;
- determining a reference point of one of the video frames and determining reference points of the other video frames as coordinates obtained by adding a motion vector of a camera viewpoint to the reference point of the one of the video frames;
- transmitting the video frames along with the reference points thereof from the first terminal device to the second terminal device;
- receiving and rendering the video frames by the second terminal device;
- displaying an object generated by user manipulation on at least one of the video frames rendered by the second terminal device;
- calculating a relative position of the object with respect to the reference point of the at least one of video frames; and
- transmitting object position information generated based on the relative position of the object from the second terminal device to the first terminal device,
- receiving the object position information by the first terminal device;
- determining a position of the object on a video frame which is rendered on the first terminal device, based on the relative position between a point on spatial coordinates indicated by the object position information and the reference point of the video frame which is rendered on the first terminal device; and
- rendering the object at the determined position on the video frame which is rendered on the first terminal device.

* * * * *